United States Patent [19]
Allen et al.

[11] 3,837,716
[45] Sept. 24, 1974

[54] AIR, GAS OR FLUID BEARINGS

[75] Inventors: Nigel Stafford David Allen, Poole; Walter Kammerling, Bournemouth, both of England

[73] Assignee: Federal-Mogul Westwind Air Bearings Limited, Branksome, Pool, Dorset, England

[22] Filed: Nov. 15, 1972

[21] Appl. No.: 306,805

[30] Foreign Application Priority Data
Nov. 16, 1971  Great Britain .................... 53090/71

[52] U.S. Cl. .............................................. 308/9
[51] Int. Cl. ........................................ F16c 17/16
[58] Field of Search ............................. 308/9, 122

[56] References Cited
UNITED STATES PATENTS
2,673,767  3/1954  Schoeppner ..................... 308/122
2,937,908  5/1960  Golten .............................. 308/122
3,210,044  10/1965  Mori .................................... 308/9

FOREIGN PATENTS OR APPLICATIONS
242,769  11/1925  Great Britain ..................... 308/122

Primary Examiner—Charles J. Myhre
Assistant Examiner—Frank Susko
Attorney, Agent, or Firm—Larson, Taylor & Hinds

[57] ABSTRACT

A fluid bearing which comprises first and second mutually facing relatively rotatable members, one of the mutually facing surfaces having formed therein a recess acting as a fluid reservoir to which is supplied pressure fluid via a supply conduit and a series of blind ended, preferably parallel, grooves formed in that one surface and in communication with the recess.

11 Claims, 6 Drawing Figures ically extending surfaces having formed therein a recess acting as a fluid reservoir, a supply conduit in communication with said recess for supplying fluid thereto during bearing use, and a series of blind ended grooves formed in said one surface and in communication with said recess.

AIR, GAS OR FLUID BEARINGS

This invention relates to air, gas or fluid bearings.

According to the invention there is provided a fluid bearing comprising first and second relatively rotatable members having mutually facing surfaces, one of said surfaces having formed therein a recess acting as a fluid reservoir, a supply conduit in communication with said recess for supplying fluid thereto during bearing use, and a series of blind ended grooves formed in said one surface and in communication with said recess.

Embodiments of the invention will now be described by way of example only with reference to the accompanying drawings in which.

Figure 1:
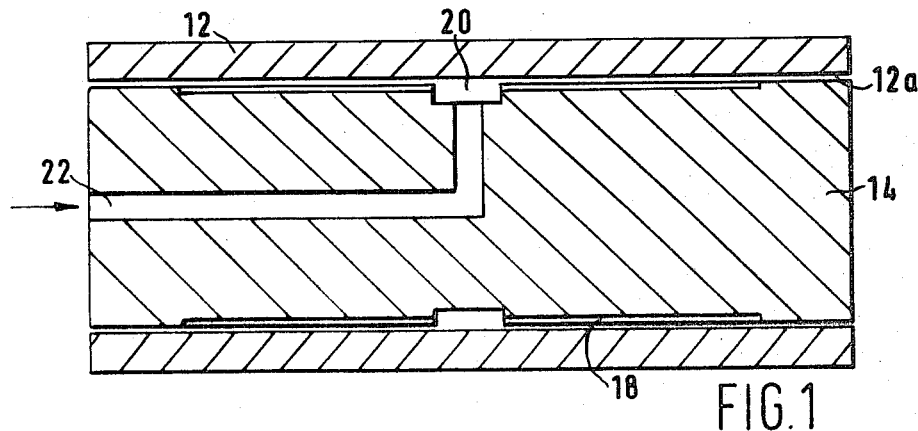
FIG. 1 is a longitudinal section through a bearing according to the present invention.
Figure 2:
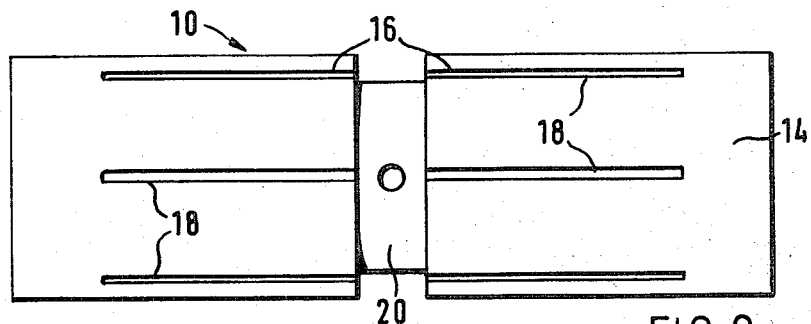
FIG. 2 is a plan view of a shaft of the bearing of FIG. 1.

Referring to FIGS. 1 and 2, the gas bearing 10 includes an annular bearing member 12 having a plain inner surface 12a and within which a shaft 14 is positioned with its peripheral surface facing surface 12a, the member 12 and shaft 14 being capable of relative rotation; the shaft has provided in its peripheral surface two axially spaced series 16 of axially extending, peripherally spaced, blind ended grooves 18 disposed on opposite sides of a common annular recess 20 each groove of each series being in communication with the annular recess 20 which acts as a gas reservoir. The gas reservoir is in communication with an axially and radially extending conduit 22 which during use of the gas bearing is connected to a supply of gas under pressure.

In a modification, the grooves 18, are formed in the inner surface 12a of the bearing member instead of shaft 14, the supply air under these conditions being suitably directed to match.

The shaft 14 when deflected within bearing member 12 changes the pressure profile and the difference between radially opposed pressure profiles constitutes the radial load carrying capacity of the bearing.

Figure 3:
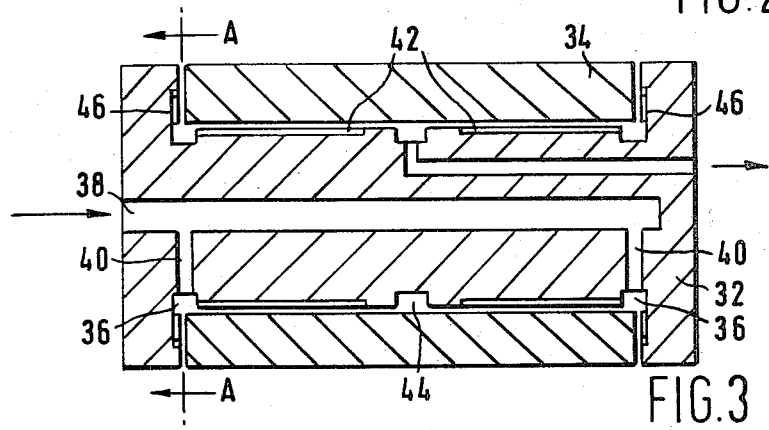
FIG. 3 is a longitudinal section through another embodiment of bearing according to the present invention.
Figure 4:
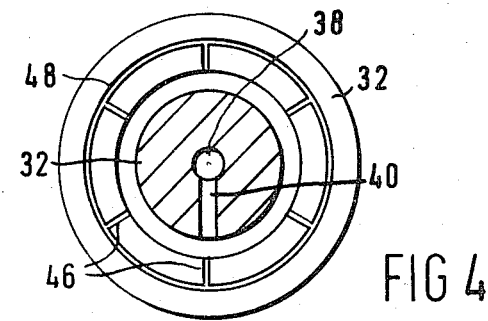
FIG. 4 is a section along the line A—A in the FIG. 3.

The gas bearing 30 of FIGS. 3 and 4 is able to absorb both radial and axial applied loads. The bearing includes a generally cylindrical shaft 32 having an annular depression 48 formed in its outer peripheral surface, and an annular member 34 positioned in that depression to provide with the shaft mutually facing surfaces extending both axially and radially of the shaft, the shaft 32 and member 34 being relatively rotatable. Formed in the shaft at each end of the depression is a respective one of two annular recesses 36 acting as gas reservoirs and supplied with gas under pressure from an axially extending central conduit 38 and a respective one of two radially extending conduit 40. Extending axially from each recess toward the centre of the depression is a respective one of two series of peripherally spaced blind end grooves 42 formed in the axially extending portion of the peripheral surface of the shaft, exhaust gas being directed away from the grooves by means of an annular exhaust conduit 44 disposed between the series of grooves.

To accommodate axially applied loads, the bearing is provided with two series of radially extending, angularly spaced, grooves 46, each series being in communication with a respective one of the recesses 36 and with a respective one of two annular grooves 48, the grooves 46 and 48 being formed in those radially extending peripheral surfaces of the shaft which face the member 34.

If desired, the grooves 42, 46 and 48 instead of being formed in the shaft could be formed in those peripheral surfaces of member 34 facing shaft 32, the supply air under these conditions being suitably directed to match.

Figure 5B:
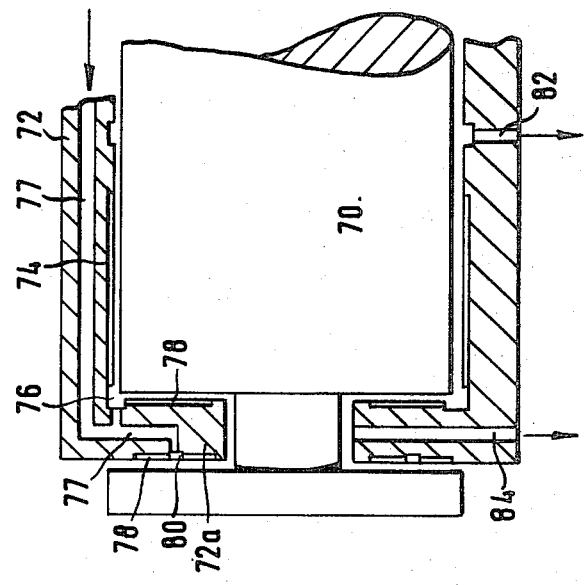
FIG. 5a and 5b show in longitudinal section further embodiments of bearings according to the present invention.
Figure 5A:
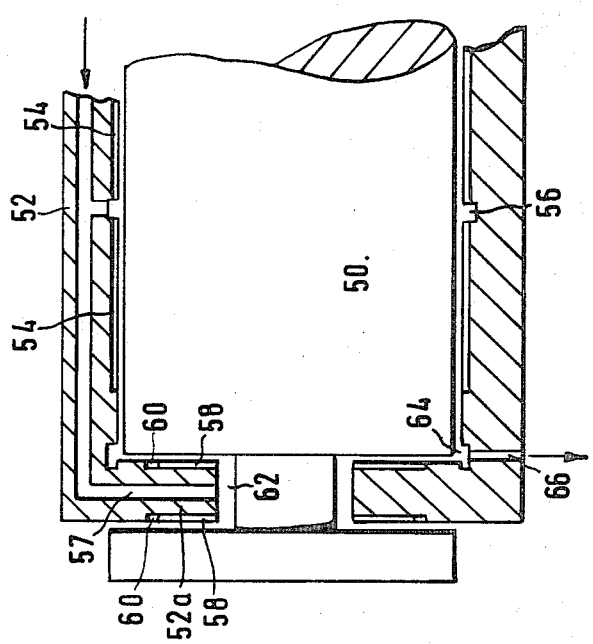

FIGS. 5a and 5b show further embodiments of gas bearing suitable for carrying axial and radial loads. In FIG. 5a, a shaft 50 is surrounded by a bearing member 52 having a radially inwardly extending flange 52a located in an annular depression in the shaft. Formed in the inner peripheral surface of member 52 are two series of axially extending, peripherally spaced, blind ended grooves 54, each groove being in communication with an annular recess or gas reservoir 56 supplied through conduit 57 with gas under pressure. Formed in each of opposite radially extending faces of flange 52a is a respective one of two series of radially extending peripherally spaced grooves 58 in communication at their radially outer ends with a respective one of two annular grooves 60; gas under pressure is supplied to the grooves 58 via conduit 57 and space 62 formed between the shaft and flange 52a. Exhaust gas from grooves 54 and 58 is directed via annular recess 64 formed in member 52 to exhaust conduit 66.

In FIG. 5b, a shaft 70 is again surrounded by a bearing member 72 having a radially inwardly extending flange 72a located in an annular depression in the shaft. Formed in the inner peripheral surface of member 72 is a series of axially extending, peripherally spaced, blind end grooves 74, each groove being in communication with an annular recess or gas reservoir 76 supplied through conduit 77 with gas under pressure. Formed in each of opposite radially extending faces of flange 72a is a respective one of two series of blind ended grooves 78, one series being supplied with gas from recess 76 and the other series being supplied with gas from conduit 77 and a common annular groove 80. Exhaust gas from groove 74 and 78 is directed from the bearing through conduits 82 and 84 respectively formed in member 72.

It will be apparent that the above described gas bearings are of simple construction and can be manufactured at low cost.

What is claimed is:

1. A fluid bearing comprising first and second relatively rotatable members having mutually facing axially extending surfaces, one of said surfaces having a recess formed therein which serves as a fluid reservoir, a supply conduit in communication with said recess for, during the bearing operation, supplying fluid at the supply pressure to said recess, and a plurality of blind ended grooves which are formed in said one surface and are in communication with said recess, one of said members including an annular depression therein and at least a portion of the other of said members being positioned in said depression so as to provide mutually facing radially extending surfaces, at least one of said radially extending surfaces including further grooves therein.

2. A fluid bearing as claimed in claim 1 wherein one of said members is a shaft and the other of said members is a bearing, and said depression is formed in said shaft and at least a portion of said bearing is positioned in said depression.

3. A fluid bearing as claimed in claim 2 wherein a said annular recess is formed at each of the opposite ends of said depression, said blind ended grooves extending axially from said recesses towards the center of said depression and said further grooves being formed in a said radially extending surface formed by said shaft and extending radially from a said recess.

4. A fluid bearing as claimed in claim 3 wherein said further grooves comprise first and second series of radial grooves formed in first and second radially extending surfaces of said shaft and extending radially from respective of said recesses.

5. A fluid bearing as claimed in claim 3 further comprising an annular groove formed in said radially extending surface, said further grooves being in communication with said annular groove at the outer ends thereof.

6. A fluid bearing as claimed in claim 2 wherein said depression is formed in the outer peripheral surface of said shaft and said bearing includes a radially inwardly extending flange which is positioned in said depression.

7. A fluid bearing as claimed in claim 6 wherein said recess is formed in an axially extending surface of said bearing member, said bearing member further including an outlet located in said flange and connected to said supply conduit.

8. A fluid bearing a claimed in claim 7 wherein said bearing includes a further recess located at the intersection of said axially extending surface and a said radially extending surface, and an outlet conduit in communication with said further recess.

9. A fluid bearing as claimed in claim 6 wherin said further grooves comprise first and second sets of radial grooves located on opposite sides of said flange.

10. A fluid bearing as claimed in claim 8 wherein said flange includes first and second annular grooves located in opposite sides thereof, said radial grooves of said first and second sets being in communication at the outer ends thereof with said first and second annular grooves, respectively.

11. A fluid bearing as claimed in claim 6 wherein said bearing member includes a further recess located in the axially extending surface thereof and an outlet conduit connected to said recess, the first mentioned recess being located at the intersection of said axially extending surface and a radially extending surface and the flange of said bearing member including an outlet located in one radially extending surface thereof and in communication with said supply conduit, and a plurality of blind ended grooves in communication with said outlet, said flange further including a plurality of blind ended grooves located in the other radially extending surface thereof and in communication with the said first mentioned recess.

* * * * *